(12) United States Patent
Gitzinger et al.

(10) Patent No.: US 7,443,657 B2
(45) Date of Patent: Oct. 28, 2008

(54) DUAL POSITION DISPLAY IN AN ELECTRONIC DEVICE

(75) Inventors: Thomas E. Gitzinger, Palatine, IL (US); Michael L. Charlier, Palatine, IL (US); Paul R. Steuer, Hawthorne Woods, IL (US)

(73) Assignee: Motorola Inc, Schaumburg, IL (US)

( * ) Notice: Subject to any disclaimer, the term of this patent is extended or adjusted under 35 U.S.C. 154(b) by 49 days.

(21) Appl. No.: 10/895,695

(22) Filed: Jul. 21, 2004

(65) Prior Publication Data

US 2006/0018088 A1    Jan. 26, 2006

(51) Int. Cl.
*H05K 5/00* (2006.01)
*G06F 3/02* (2006.01)
*G02F 1/1335* (2006.01)
*G03H 1/00* (2006.01)
*G03B 21/22* (2006.01)

(52) U.S. Cl. .................. 361/681; 361/683; 361/727; 345/169; 349/5; 359/13; 353/74; 353/79

(58) Field of Classification Search ................ 361/727, 361/679–681, 683, 686; 345/169; 349/5–11; 359/13; 353/74, 76–79
See application file for complete search history.

(56) References Cited

U.S. PATENT DOCUMENTS

| | | | |
|---|---|---|---|
| 4,358,184 A | 11/1982 | Schmidt | |
| 4,452,528 A * | 6/1984 | Rath | 355/51 |
| 5,091,873 A * | 2/1992 | Araki | 361/681 |
| 5,467,504 A * | 11/1995 | Yang | 16/342 |
| 5,483,250 A * | 1/1996 | Herrick | 345/32 |
| 5,510,806 A * | 4/1996 | Busch | 345/87 |
| 6,059,413 A * | 5/2000 | Okubo | 353/77 |
| 6,219,183 B1 * | 4/2001 | Doany | 359/450 |
| 6,483,445 B1 * | 11/2002 | England | 341/22 |
| 6,525,750 B1 * | 2/2003 | Knox | 345/30 |
| 6,637,896 B2 * | 10/2003 | Li et al. | 353/119 |
| 6,865,075 B2 * | 3/2005 | Oakley | 361/683 |
| 6,899,433 B2 * | 5/2005 | Veligdan | 353/37 |
| 2003/0058415 A1 * | 3/2003 | Cha et al. | 353/77 |
| 2005/0253776 A1 * | 11/2005 | Lee et al. | 345/1.3 |

* cited by examiner

*Primary Examiner*—Jayprakash Gandhi
*Assistant Examiner*—Zachary M Pape
(74) *Attorney, Agent, or Firm*—Randall S. Vas; Gary J Cunningham

(57) ABSTRACT

An apparatus and method are disclosed for an electronic device (100) to incorporate two housing members (104, 106) to expose a first portion (112) of a display or screen (110) when closed. When the two members (104, 106) are moved to open the housing (102) the display or screen (110) is moved to a position angularly displaced from its former position with respect to the housing (102). A second portion (114) of the screen (110), larger than the first portion (112), is exposed and used for displaying text, images or other graphics.

18 Claims, 7 Drawing Sheets

DUAL POSITION DISPLAY IN AN ELECTRONIC DEVICE

TECHNICAL FIELD

This patent relates to electronic devices and more particularly to electronic devices suited to hand-held use having a dual position display.

BACKGROUND

Electronic devices capable of presenting images in two formats, that is with part of the image covered in one instance and with less of the image covered in another instance are known. Cellular telephones exist in many such formats, for example, where one half of a clam shell housing has a window for viewing a portion of a display and the full display is revealed when the housing is opened.

Displays for electronic devices can take many forms, including light emitting diodes (LEDs), liquid crystal display (LCD) panels, twisted nematic (TN) and others. New technologies proposed for electronic devices include so called digital paper using electronic ink.

Displays for non-portable electronic devices include cathode ray tubes, plasma displays and projection displays. Projection displays for non-portable electronic devices may be either front projection or rear projection.

When applied to portable electronic devices, any conventional display technology may too large or too energy inefficient for creating thin, conveniently-sized devices for current and next generation applications.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
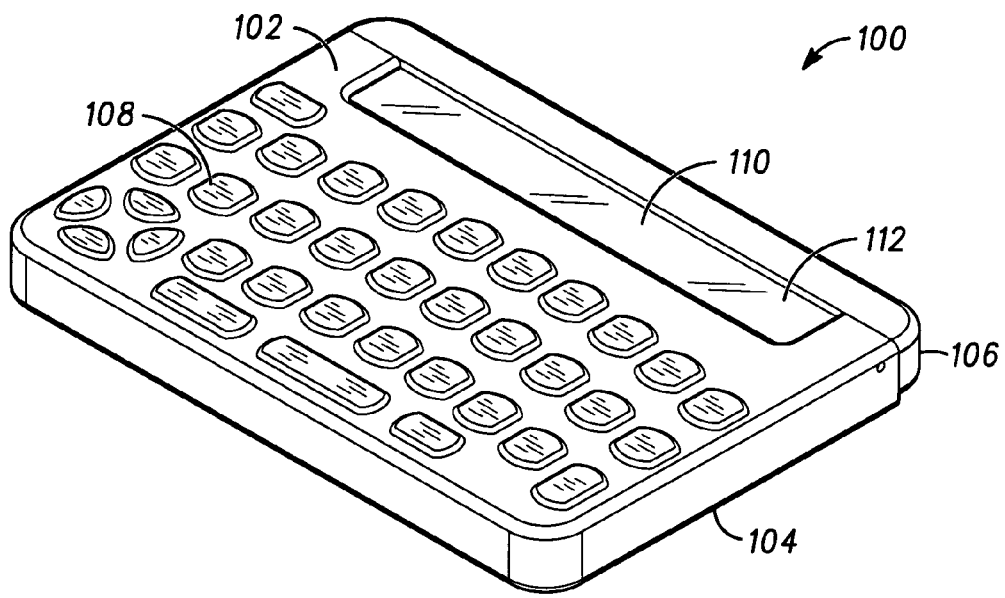
FIG. 1 depicts, in a simplified and representative form, a perspective view of an electronic device.

In overview, the present disclosure concerns dual position displays for cellular telephones, pagers, personal digital assistants, organizers, palm computers, laptop computers and other electronic devices where overall size, light weight and thin form factors are desirable. More particularly, various inventive concepts and principles are embodied in methods and apparatus for the use of such displays to improve the usability, convenience, and entertainment value of an electronic device having such equipment. The electronic devices of interest may have the ability to communicate wirelessly but it is not necessary. The displays contemplated may be integral to the electronic device or may be instantiated as an add-on module.

As further discussed below various inventive principles and combinations thereof are advantageously employed to allow a user to view a comparatively small portion of a display while the electronic device is in its closed or small form, while enjoying the benefit of a comparatively large viewing area when the electronic device is opened. The several embodiments present a variety of techniques for advantageously using the dual position display for meeting the needs of mobile professionals and other users. In one embodiment a sliding mechanism is used to deploy a screen used for viewing text or other images. The image may be presented on an integral display such as an LCD panel or may use a screen and projector system. One such projector uses a bank of LEDs or a vertical cavity surface emitting laser (VCSEL) and a mirror that is either rotated or vibrated to "paint" the screen surface.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 2:
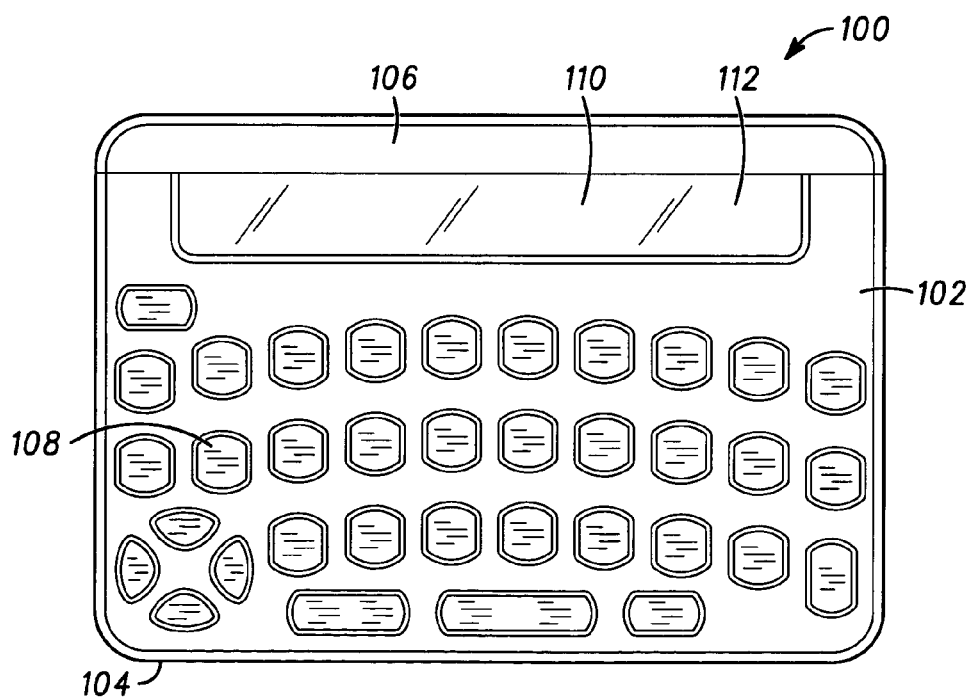
FIG. 2 depicts, in a simplified and representative form, a top view of the electronic device.

Referring to FIG. 1, a simplified and representative perspective view of an electronic device with a dual position display is discussed and described. The electronic device 100 has a housing 102 having of a first member 104 and a second member 106. The second member 106 can be connectively coupled to the first member 104. An optional keypad 108 is shown disposed on the first member 104. A display or screen 110, more particularly a first portion 112 of the display or screen 110 is viewable when the housing 102 is in a closed position, with two members 104, 106 in a closed position in relation to each other. FIG. 2 is a top view of the electronic device 100, showing the same elements as described above.

Figure 3:
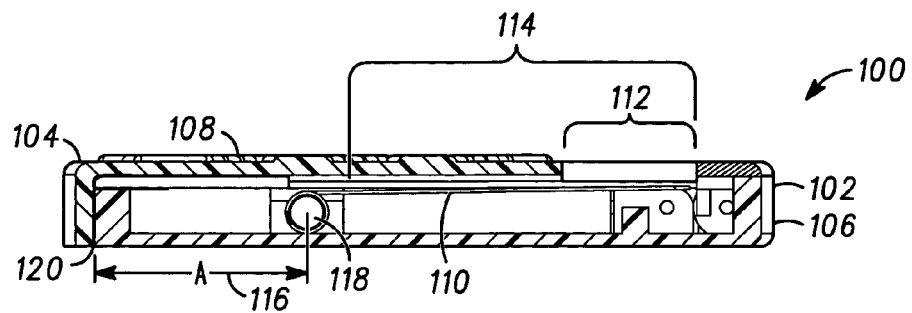
FIG. 3 depicts, in a simplified and representative form, a side view of the electronic device.

FIG. 3, a side view of the electronic device 100 shows the electronic device 100 with the housing 102 in the closed position. A second portion 114 of the display or screen 108 is shown partially covered by the first member 104. Dimension 'A' 116 shows the relationship between a pivot point 118 for the screen and a reference point 120 on the second member 106. The display or screen 110 may be substantially parallel to the second member 106 when the electronic device 100 is in the closed position.

Figure 4:
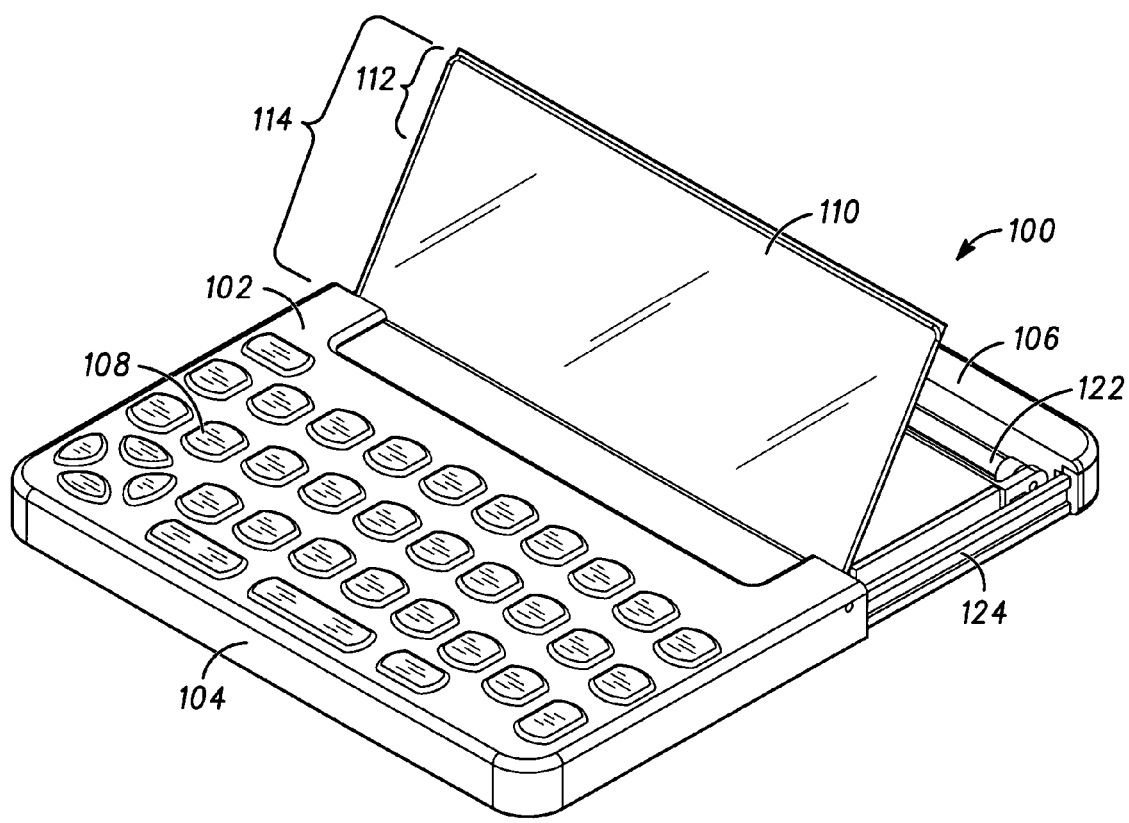
FIG. 4 depicts, in a simplified and representative form, a perspective view of an electronic device in the open position.

FIG. 4, is a simplified and representative perspective view of the electronic device 100 in an open position. The screen or display 110 is shown angularly displaced to the second member 106 in this open position, with the second member 106 partially withdrawn from the first member 104. The angle of the displacement may be between 0 and 180 degrees. That is, the display or screen 100 lying in a first plane and the second member lying in a second plane, wherein the first plane does not intersect the second plane when the housing is in a second position. For example, the screen may be non-parallel with the second member when the housing is in the second position. The second portion 114 of the display 110 is viewable. The second portion 114 may encompass the first portion 112 as shown. In other embodiments, this may not be the case.

A light source (not depicted), such as an LED or VCSEL laser and mirror 122, may be disposed in the housing 102 for projecting a raster line of text or an image to be displayed. The raster line of the image may be projected from the light source onto the mirror 122. The mirror 122 is capable of being rotated or vibrated in such a manner as to move the raster line of the image across one of the portions 112, 114 of the display or screen 110. In the closed position shown in FIG. 3, only the first portion 112 of the display is used. In the embodiment depicted, the projector mirror 122 is shown attached to the second member 106. In other embodiments, such as when the display or screen 110 is self-contained (e.g. an LCD), the projector mirror 122 and other projector components (not depicted) may not be present. Guide rails 124 may be used to facilitate the partial withdrawal of the second member 106 from the first member 104 to place the housing 102 in the open position.

Figure 5:
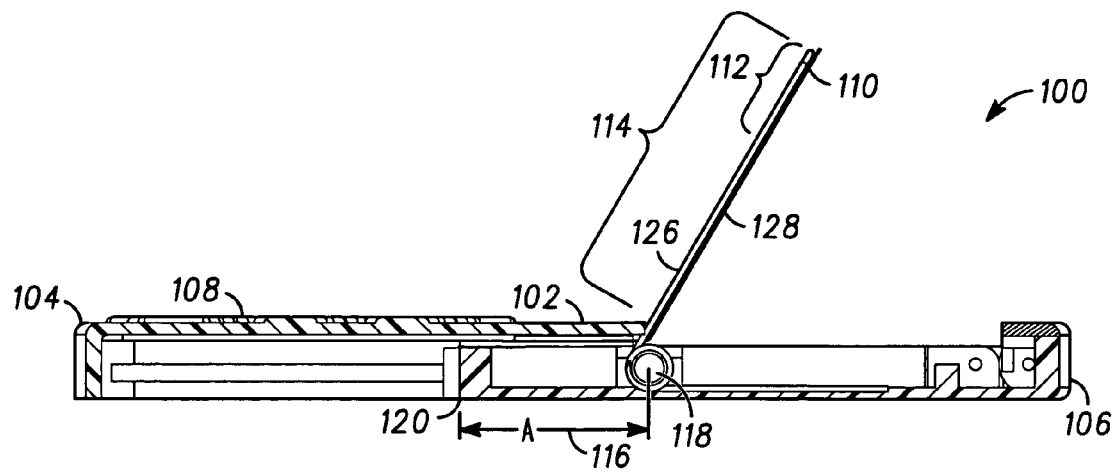
FIG. 5 depicts, in a simplified and representative form, a side view of the electronic device in the open position.

FIG. 5 is a simplified and representative side view of the electronic device 100 with the housing 102 in the open position. The screen or display 110 is shown having a front side 126 and a back side 128. When the screen or display 110 is viewed from the front side 126 and the mirror 122 or other apparatus is used to project the image on the back side 128, the screen or display 110 may be translucent. Films suitable for projection in this manner may be fabrics or plastics from companies such as 3M. A holographic film (not depicted) may be used on the screen or display 110 to improve the efficiency and sharpness of a displayed image by as much as 5-20 times, but at a cost of limited viewing angle. Note that in the embodiment depicted, the dimension 'A' 116 remains constant as the second member 106 is withdrawn from the first member 104.

Figure 6:
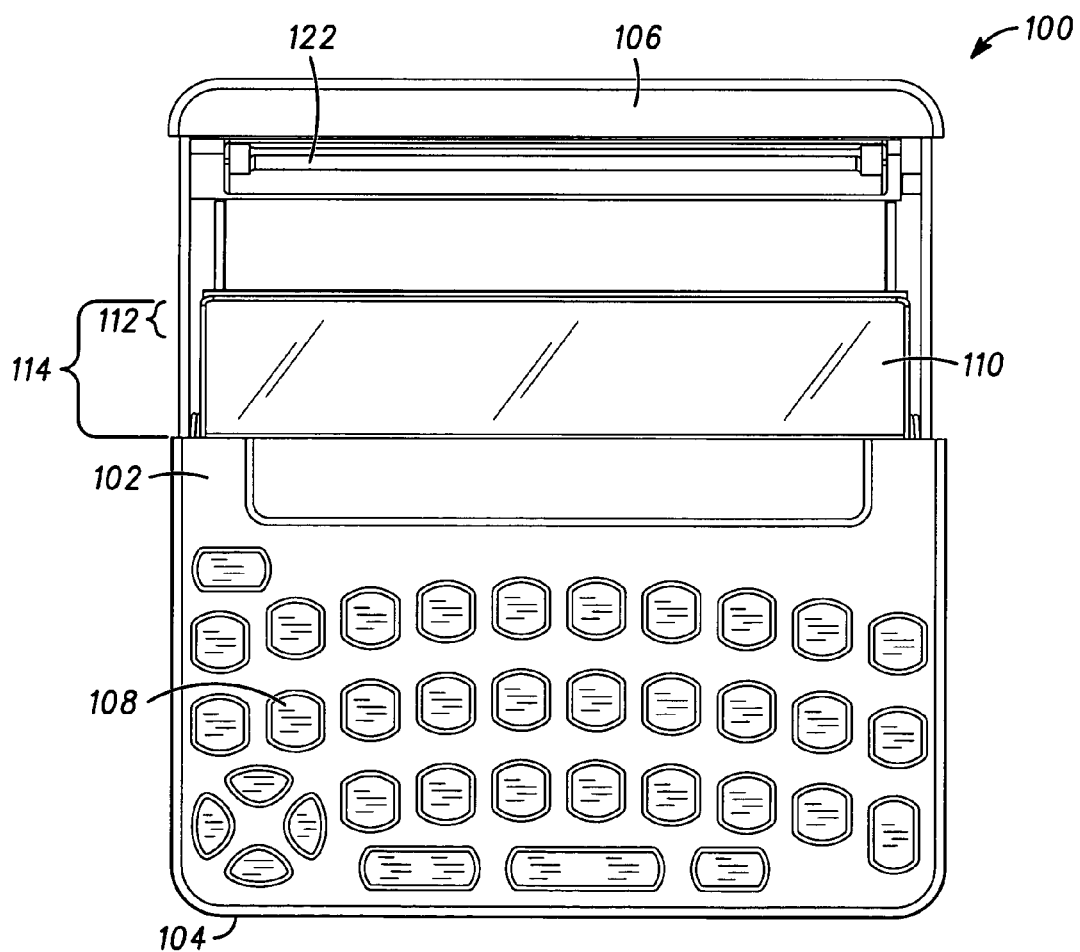
FIG. 6 depicts, in a simplified and representative form, a top view of the electronic device in the open position.

FIG. 6 shows a top view of the electronic device 100. The first 112 and second 114 portions are shown for the screen or display 110.

The elements of the electronic device 100 are known and available. The housing and keypad of the electronic device 100 are commodity objects found in pagers, cellular phones and personal digital assistants from many manufacturers. Light emitting diode and vertical cavity surface emitting laser (VCSEL) are available from manufacturers such as Honeywell Optics. Rotating or vibrating mirrors are well known in scientific and optics arenas and are available commercially.

Figure 7:
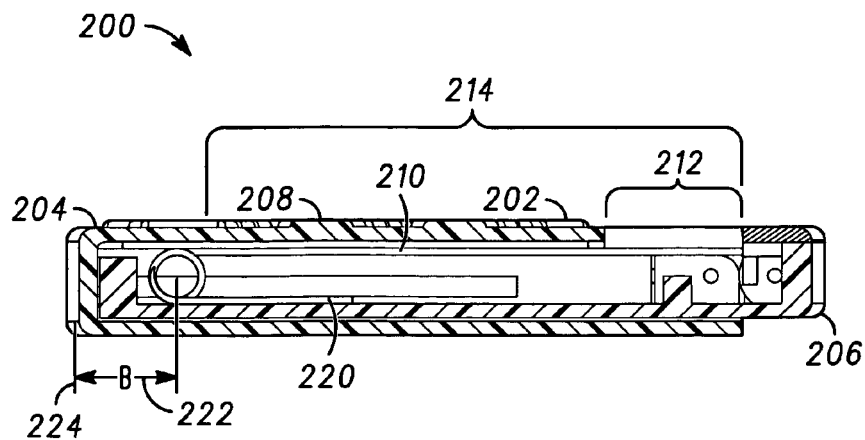
FIG. 7 depicts, in a simplified and representative form, a side view of an alternate embodiment of an electronic device in the closed position.

FIG. 7 shows, in a simplified and representative form, a side view of an alternate embodiment of an electronic device in the closed position. The electronic device 200 has a housing 202, a first member 204 and a second member 206. The first and second members 204, 206 may be connectively coupled, in this embodiment coupled so the second member 206 is partially inside the first member 204 when the housing 202 is in a closed position. The electronic device 200 may have a keypad 208 disposed on one of the members 204, 206. The electronic device 200 also has a display or screen 210 for presenting an image comprising text or graphics (not depicted). A first portion 212 of the display or screen 210 is viewable when the housing 202 is closed. A second portion 214 of the display or screen 210 is partially covered when the housing 202 is closed.

To make the overall electronic device 200 more compact, an alternate mechanism is illustrated that may be employed for supporting the display or screen 210. The pivot point 220 of the display or screen 210 is coupled to the second member in the embodiment depicted and driven forward when the housing 202 is opened, that is, in the same direction of the movement of the second member 206. Note the dimension 'B' 222 with respect to the second member 206 reference point 224.

Figure 8:
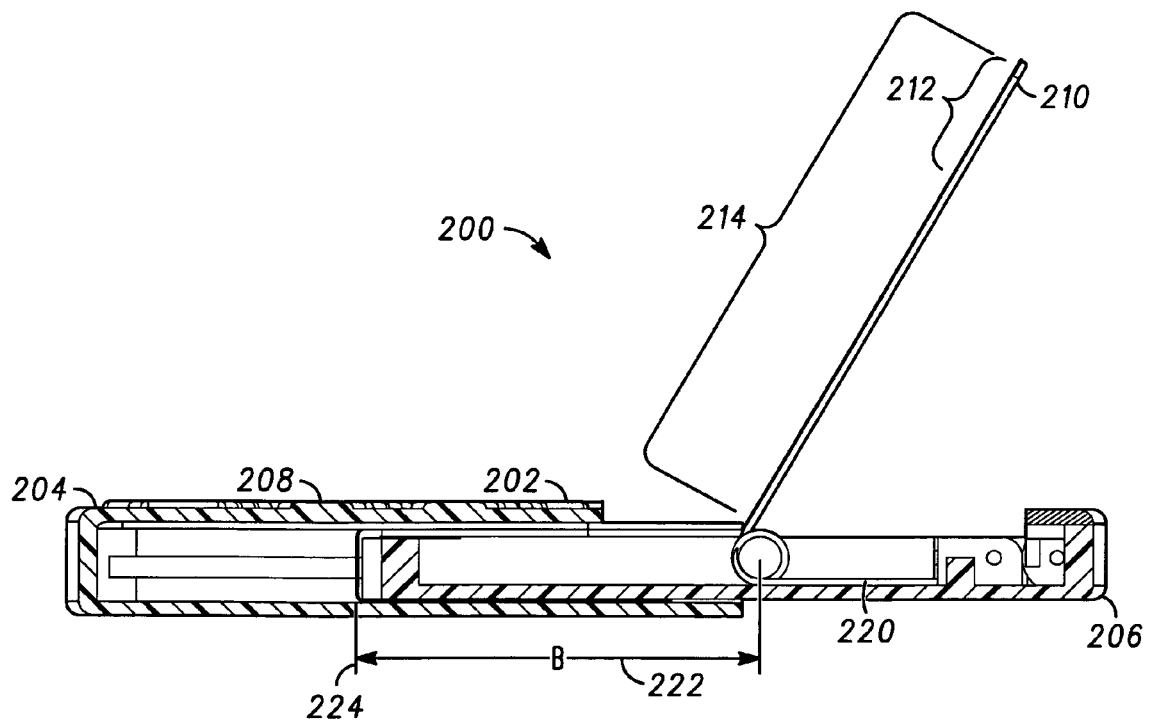
FIG. 8 depicts, in a simplified and representative form, a side view of an alternate embodiment of the electronic device in the open position.

FIG. 8 depicts a side view of the electronic device 200 with the housing 202 in the open position. With the housing the open position, when the screen is rotateably attached to the second member as shown, a spring (not depicted) may operate at the pivot point 220 to hold the display or screen 210 angularly displaced with respect to the second member 206. Using a gear or another drive mechanism, the motion of the second member 206 operates to move the pivot point out of its initial, closed, position. Note the increase of dimension 'B' 222 over dimension 'B' 222 of FIG. 7.

Figure 9:
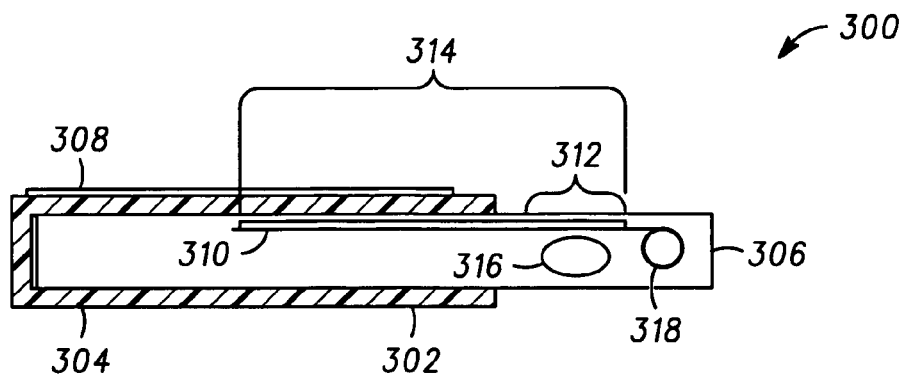
FIG. 9 depicts, in a simplified and representative form, a side view of another embodiment of an electronic device in the closed position.

FIG. 9, a side view of another embodiment of the electronic device is discussed and described. The electronic device 300 is shown having a housing 302, a first and second member 304, 306, and an optional keypad 308 disposed on the first member 304. The electronic device 300 also comprises a display 310. In the closed position depicted, a first portion 312 of the display 310 is visible while a second portion 314 is partially hidden by the first member 304. A projector 316 is used to present text, images or other graphics on the first portion 312 of the display 310. The display 310 may be mounted at a pivot point 318.

Figure 10:
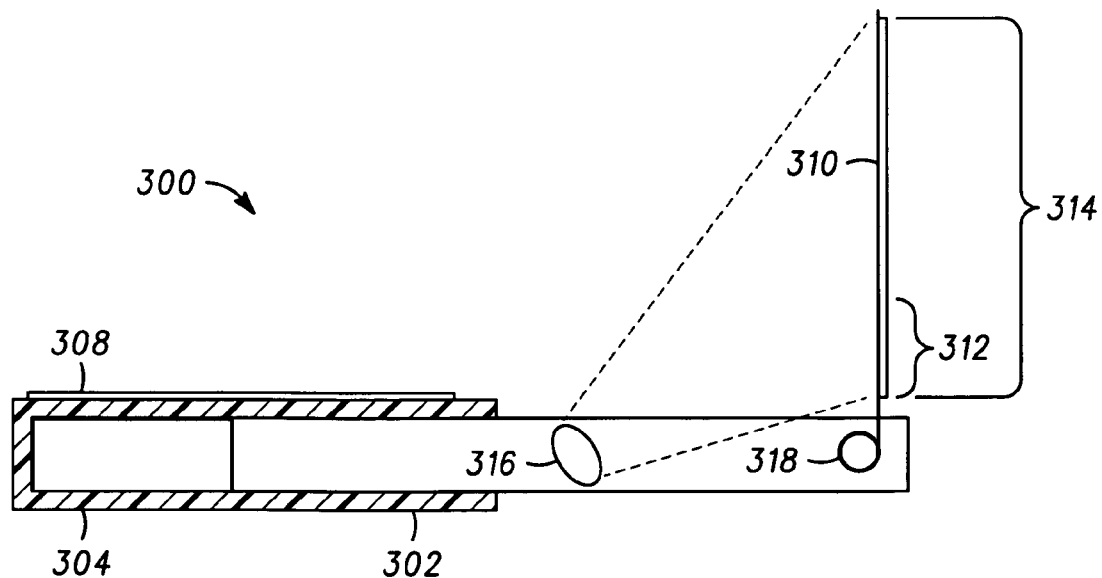
FIG. 10 depicts, in a simplified and representative form, a side view of another embodiment of an electronic device in the open position.

FIG. 10 shows in a simplified and representative form the electronic device 300 of FIG. 9 in an open, expanded manner. The display 310 lifts, in this embodiment, away from the keypad 308 around the pivot point 318. The projector 316 creates an image (not depicted) on the second portion 314 of the display 310, which may include the first portion 312. The display 310 may be either opaque or translucent when correctly viewed from the same side of the display 310 as the projector 312. When viewed from an opposite side as the projector 310, as with the first portion 312 as shown in FIG. 9, the display 310 is preferably translucent.

Figure 11:
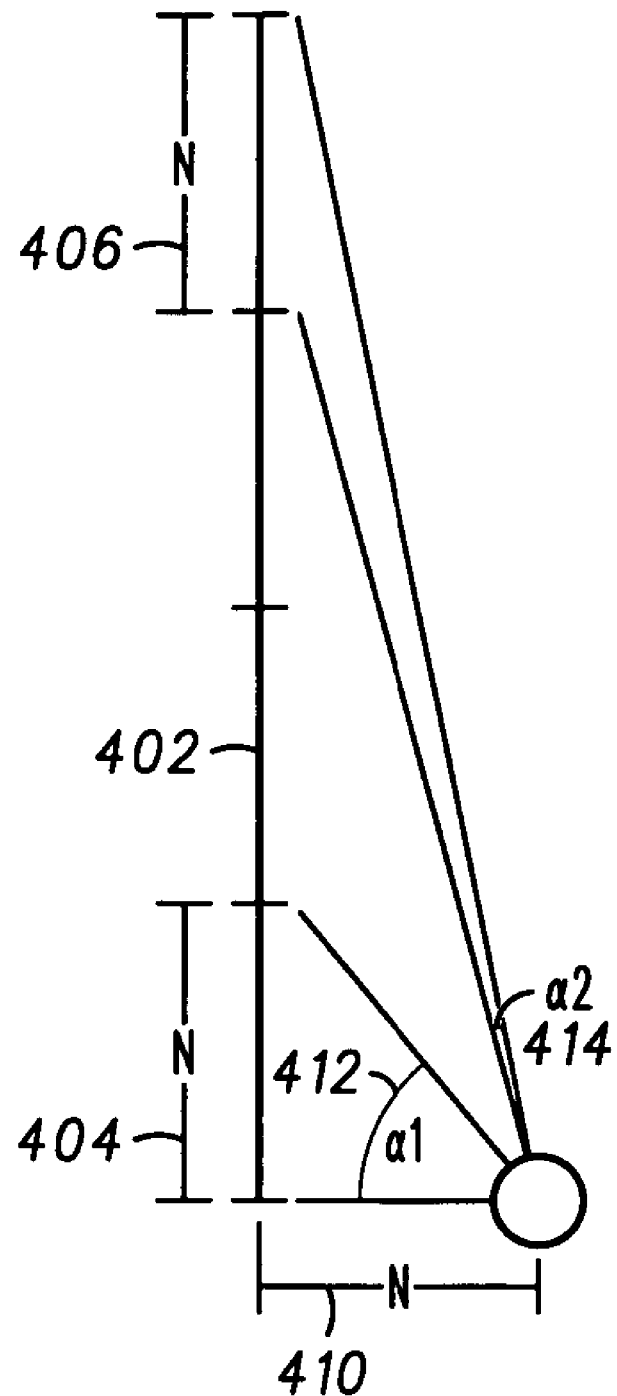
FIG. 11 is a representative view of a screen and projector for the purpose of illustrating angular velocity.

Referring to FIG. 11, a representative screen and projector arrangement is discussed for the purpose of illustrating angular velocity. An exemplary case is described to show the distribution of light on the screen during the scanning process. The exact angles used are for simplicity of illustration. It will be apparent to one of ordinary skill that the actual implementation details will vary depending on the design of the case, placement of the projector, brightness, etc. A screen 402 is shown with unit-sized portions 404, 406. A projector 408 or projection point is placed a unit length 410 from the base of the screen 402. Angle α1 412 is determined as the arctangent of 1 or 45 degrees. Angle α2 414 is the arctangent of 4 minus the arctangent of 3 or 75.9 deg–71.6 deg=4.3 deg. When light is distributed from a projector 408 in a raster scanning mode, as discussed with respect to FIGS. 7-8, it can be seen that if the mirror 218 is moved or vibrated at a constant angular velocity, the unit length 404 of the screen 402 will have approximately 10 times more light energy delivered to it than the unit length 406 of the screen 402. To deliver approximately equal light energy to the whole screen 402, the angular velocity of the projector 408 or a projector component, such as a mirror 218, may be adjusted in proportion to a ratio of the shortest distance between the project 408 and the screen 402 and the distance between the projector 408 and a point being currently projected on the screen 402.

Figure 12:
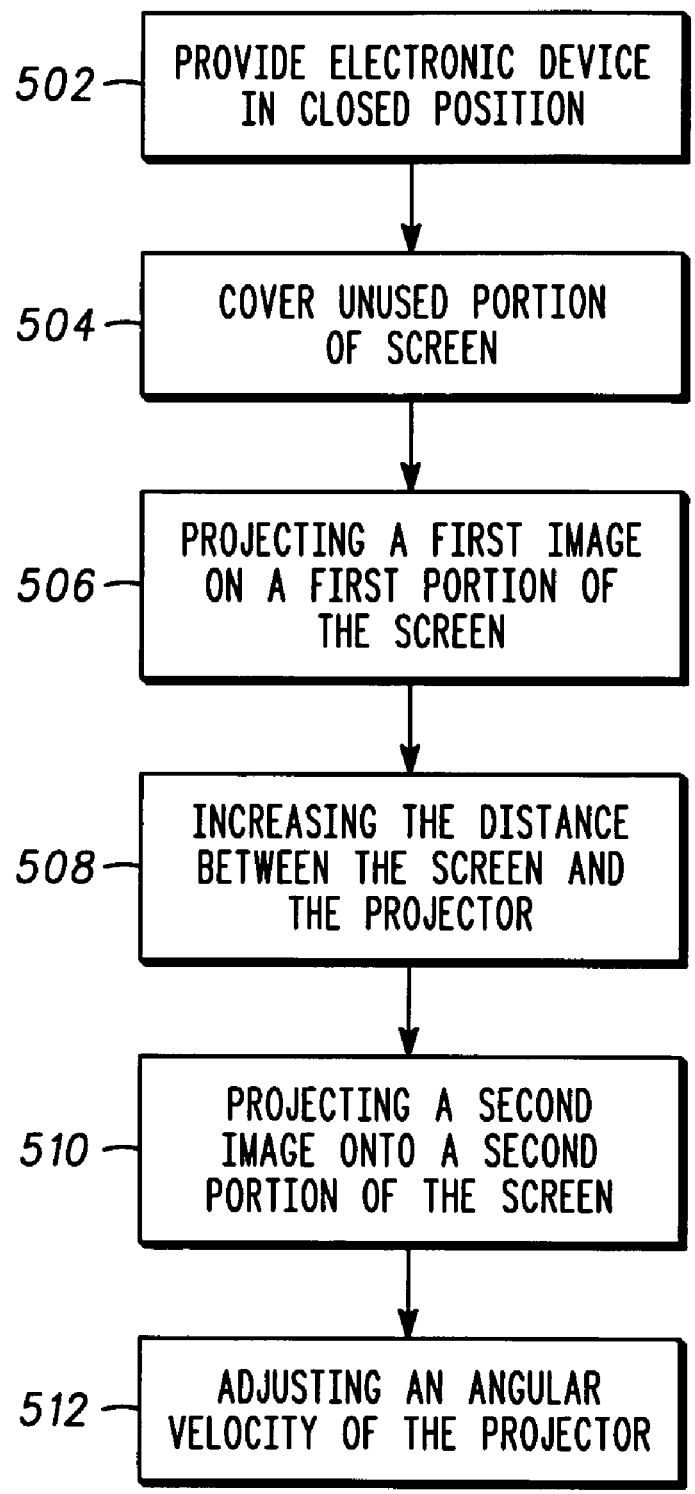
FIG. 12 is a method of using a dual position display in an electronic device.

Referring to FIG. 12, a method of using a dual position display in an electronic device is discussed and described. An electronic device 100 is provided 502 in a closed position, exposing 504 a portion 112 of the screen 110 to make it visible and viewable. By way of explanation, the term exposing is not used to imply that the portion 112 is open to the elements, but merely visible to a user of the electronic device 100. A first image may be projected 506 onto the portion 112 of the screen 110 for viewing by the user. The first image may be projected onto the back side of the screen 110 and viewed from the front side. It is contemplated that in some embodiments, the image may be projected onto a larger surface than is actually exposed for viewing, although this is done at a loss of efficiency.

The distance between the projector 122 and the screen 110 is increased 508, in one embodiment by sliding two members 104, 106 of a housing 102 apart and repositioning the screen 110 to be angularly displaced from its original orientation with respect to the housing 102. The angle may be between 0 and 180 degrees. In opening the housing 102 by sliding the two members 104,106 apart and unused portion of the screen 110 is exposed, making available for use a second portion 114 of the screen that may encompass the first portion 112. An alternate embodiment (not depicted) may increase the distance between the screen and the projector by dropping the projector away from the housing while keeping the screen 110 relatively unchanged with respect to the housing 102.

With the orientation change between the screen 110 and the projector 122 complete a second portion 114 of the screen larger than the first portion 112 is exposed. A second image, or a larger view of the first image may be projected 510 onto the screen 110. As discussed with respect to FIG. 11, an angular velocity of the projector 122 or a projector component may be adjusted to accommodate variations in the distance between the screen 110 and the projector 122.

The apparatus and methods discussed above, and the inventive principles thereof, are intended to and will enhance the use of electronic devices where size and weight are factors affecting portability, but limited display area affects usability. It is conceivable that displays approaching or exceeding the total area of the surface of the electronic device are possible, opening small devices to new application areas. The techniques described above are equally applicable for both monochrome and color displays. Using the principles of repositioning a screen or display with respect to a housing for increasing the viewing area available for users greatly enhances the overall functionality of such devices. Users benefit from the convenience of a small device with a small but useable display area when compact and the usability of the larger screen when needed. In combination with current foldable keyboards, a device incorporating the current disclosures can approach the user friendliness of a full sized computers. Manufacturers can benefit by reducing the cost and complexity of large, fixed displays. When embodied with a screen and projector arrangement, a much more durable and lower cost implementation can be achieved.

It is expected that these embodiments or others in accordance with the present invention will have application to many portable electronic devices. The disclosure extends to the constituent elements or equipment comprising such systems and specifically the methods employed thereby and therein.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

We claim:

1. An electronic device for viewing an image comprising:
a housing having a first member and a second member, the second member slidably coupled to the first member, the housing having a first position and a second position;
a screen for displaying the image, the screen coupled to the second member, the screen being:
substantially parallel to the second member when the housing is in the first position, wherein a first portion of the screen is viewable when in the first position; and
in a plane that intersects a plane of the second member when the housing is in the second position, wherein a second portion of the screen is revealed when in the second position; and
a keypad operable when the housing is in both the first position and the second position, wherein the first member slides laterally relative to the second member, the screen is pivotably coupled to the second member, and a portion of the screen is enclosed within the first member when the housing is in the first position.

2. The electronic device of claim 1 wherein the screen is translucent and the screen is viewed from a side opposite a projector of the image.

3. The electronic device of claim 1 wherein in the screen is one of opaque and translucent and the screen is viewed from a side that is the same as a projector of the image.

4. The electronic device of claim 1 wherein the screen is rotatably attached to the second member and a spring operates at a pivot point to hold the screen angularly displaced with respect to the second member when the housing is in the second position.

5. The electronic device of claim 4 wherein the pivot point is coupled to the second member.

6. The electronic device of claim 4 wherein the pivot point is slidably attached to the second member and is operable to slide in the direction of the second member when changing between the first and second positions.

7. The electronic device of claim 1 wherein the keypad is disposed on one of the first and second members.

8. The electronic device of claim 1 further comprising:
a projector for creating the image.

9. The electronic device of claim 8 wherein an angular velocity of a projector component is adjusted in proportion to a ratio of the shortest distance between the projector and the screen and a distance between the projector and a current projected point on the screen.

10. An electronic device for viewing an image comprising:
a first member;
a second member, laterally slidably coupled to the first member, the first and second members having a first position and second position relative to each other; and
a display associated with the first member, the display having a first display position relative to both members when in the first position and the display having a second display position relative to both members when in the second position, and wherein a first portion of the display is viewable when in the first display position and a second portion of the display is viewable when in the second display position; and
a keypad coupled to the second member, the keypad being accessible and operable when the display is in the first display position and the keypad being accessible and operable when the display is in the second display position.

11. The electronic device of claim 10 wherein the second portion comprises at least some of the first portion.

12. The electronic device of claim 10 wherein the display is rotatably attached to the second member at a pivot point and is angularly displaced with respect to the second member when in the second display position.

13. A method for projecting an image onto a screen in an electronic device comprising:
providing the electronic device in a closed position;
projecting a first image onto a first portion of the screen of the electronic device while the electronic device is in the closed position;
increasing a distance between a projector and the screen; and
projecting a second image onto a second portion of the screen while the electronic device is in an open position, the second portion of the screen having more area than the first portion of the screen,
wherein the method further comprises uncovering an unused portion of the screen to reveal the second portion of the screen.

14. The method of claim 13 further comprising:
exposing the first portion of the screen when in the closed position.

15. The method of claim 13 wherein the projecting the first image further comprises:
projecting the first image onto a back of the first portion of the screen wherein the first image is viewed from a front of the first portion of the screen.

16. The method of claim 13 wherein the increasing the distance between the projector and the screen further comprises repositioning the screen.

17. The method of claim 13 wherein the increasing the distance between the projector and the screen further comprises repositioning the projector.

18. The method of claim 13 further comprising:
adjusting an angular velocity of the projector according to a variation of the distance between the projector and adjacent portions of the screen.

* * * * *